June 2, 1970   G. C. MYLIN   3,515,053
MEAT INSPECTION SYSTEM AND METHOD
Filed June 14, 1968   4 Sheets-Sheet 1
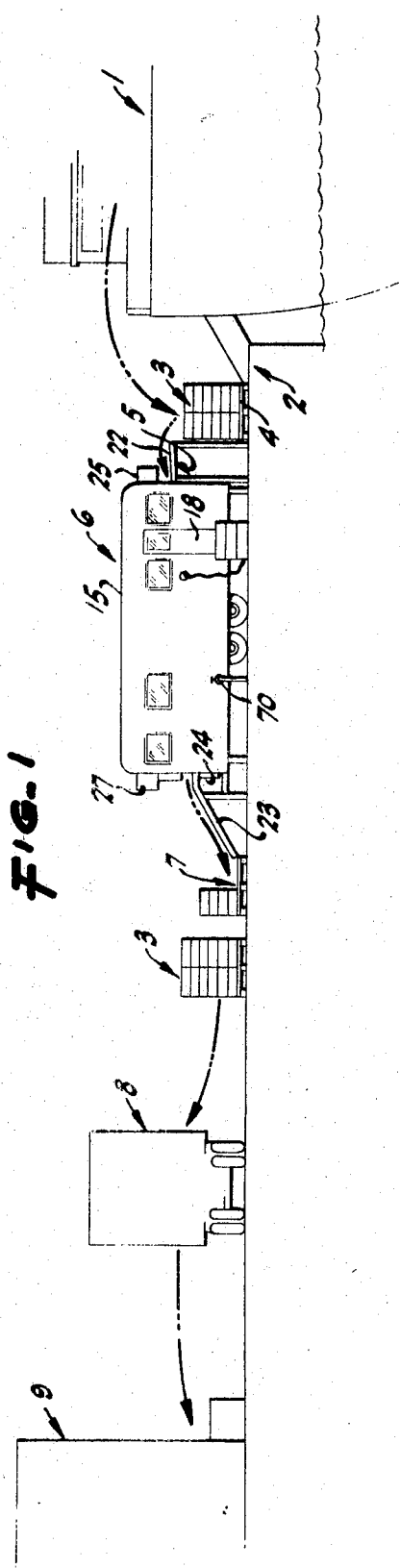
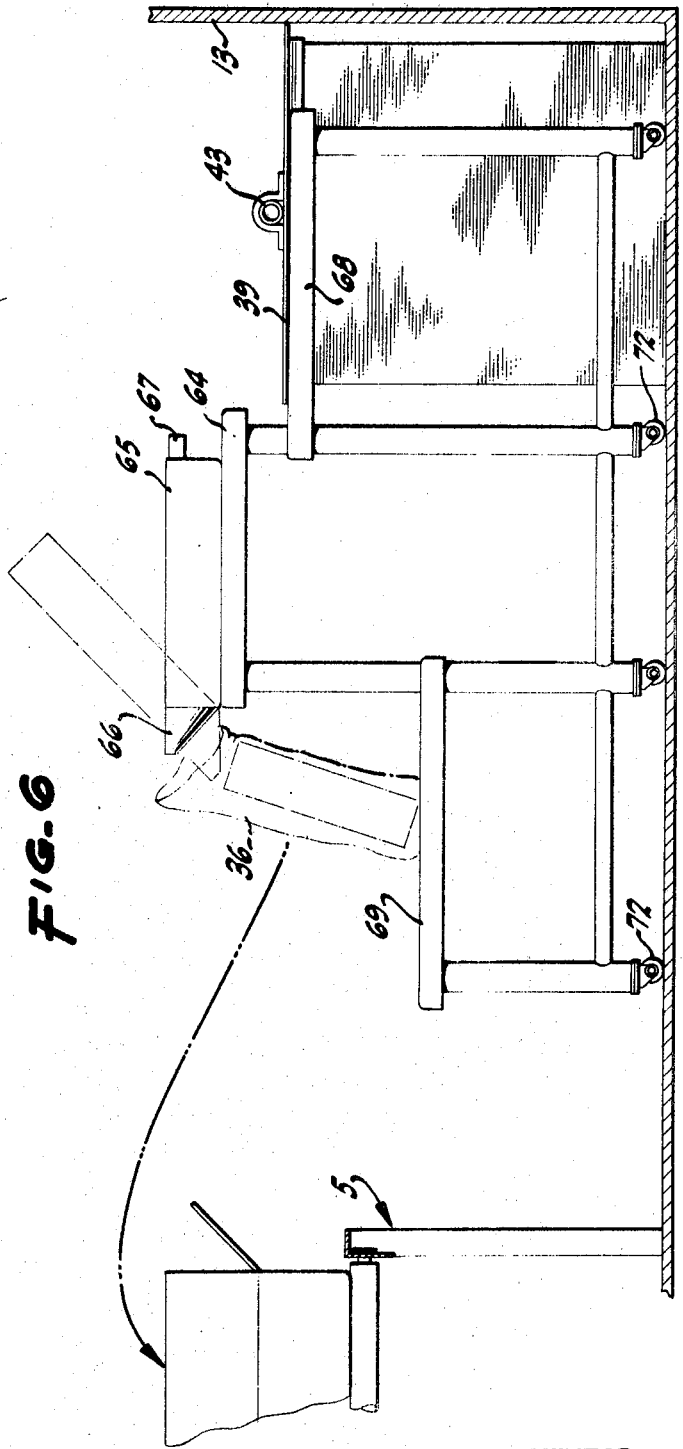
INVENTOR.
GARY C. MYLIN
BY
Bayhan, Mailin, Fosler & Schlammer
ATTORNEYS

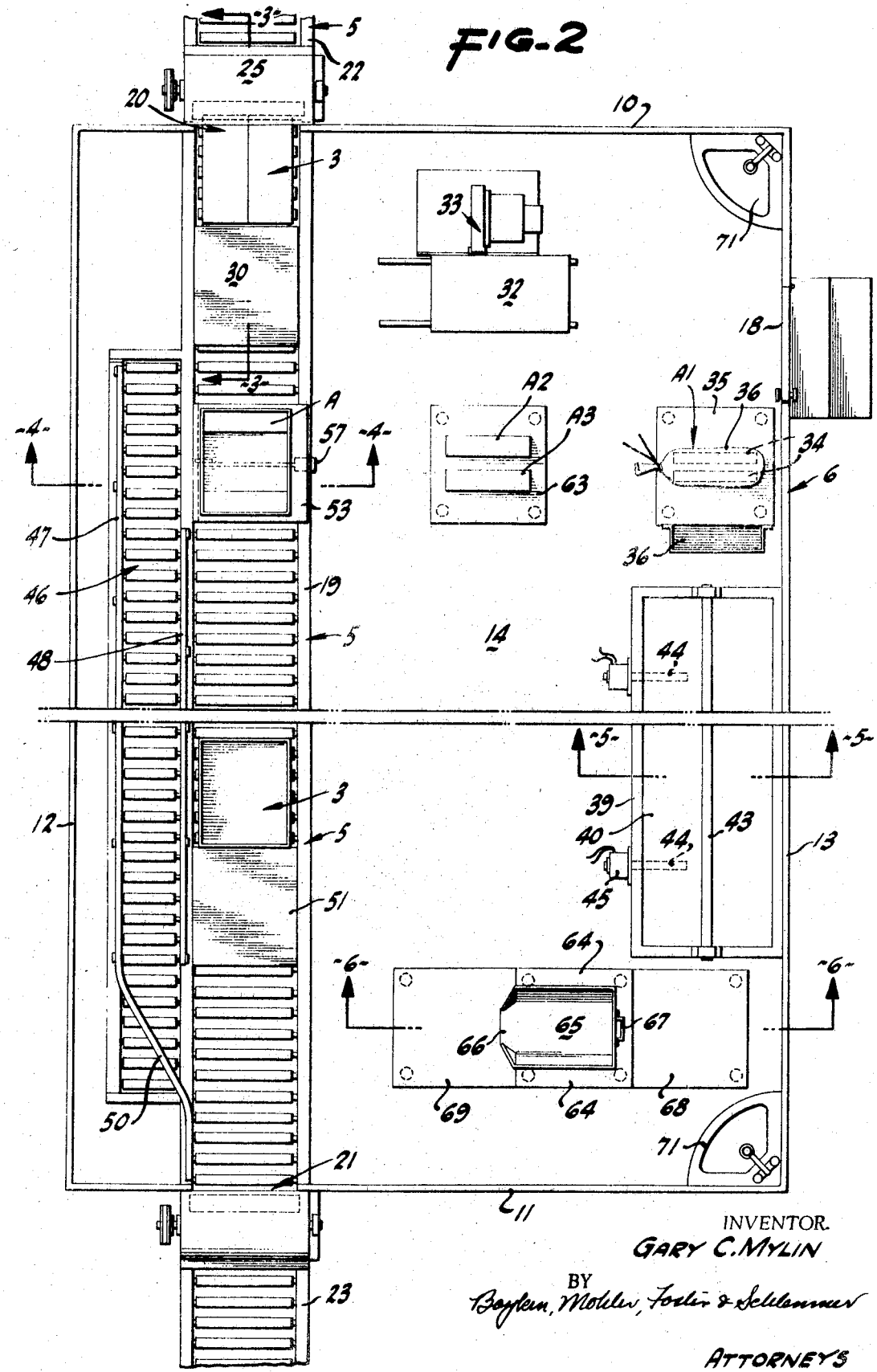

June 2, 1970 — G. C. MYLIN — 3,515,053
MEAT INSPECTION SYSTEM AND METHOD
Filed June 14, 1968 — 4 Sheets-Sheet 3

INVENTOR.
GARY C. MYLIN
BY Boykin, Mohler, Foster & Schlemmer
ATTORNEYS

June 2, 1970 G. C. MYLIN 3,515,053
MEAT INSPECTION SYSTEM AND METHOD
Filed June 14, 1968 4 Sheets-Sheet 4
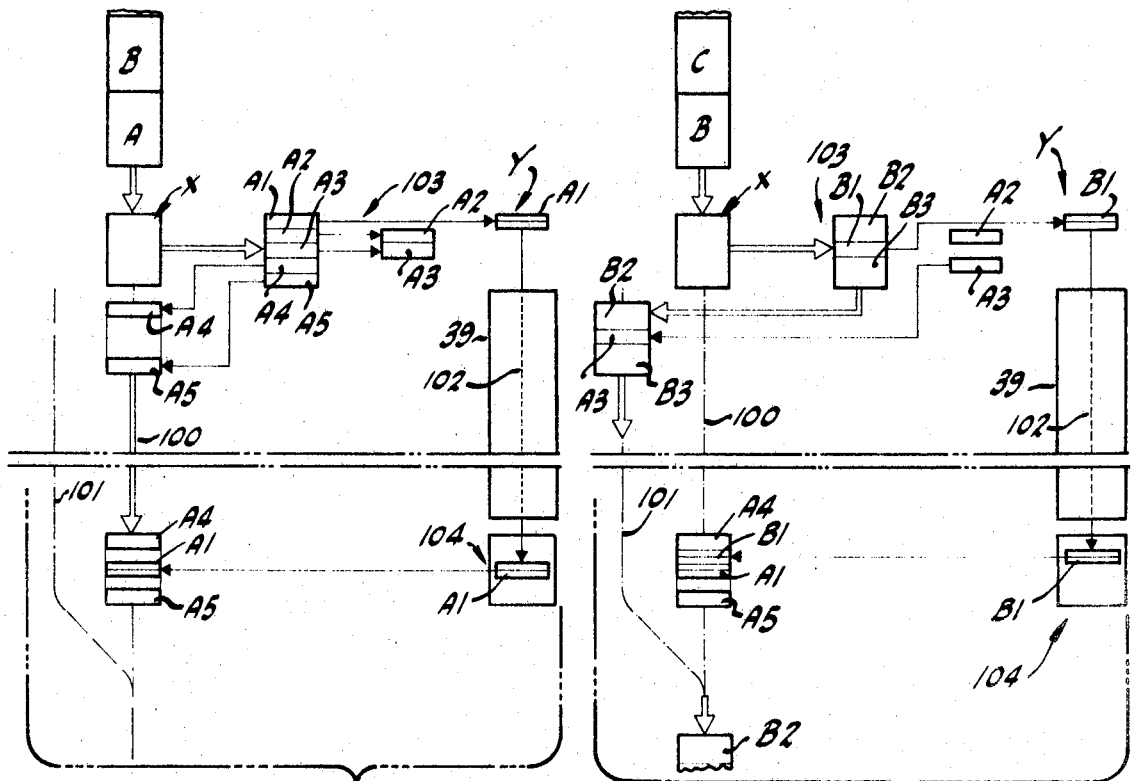
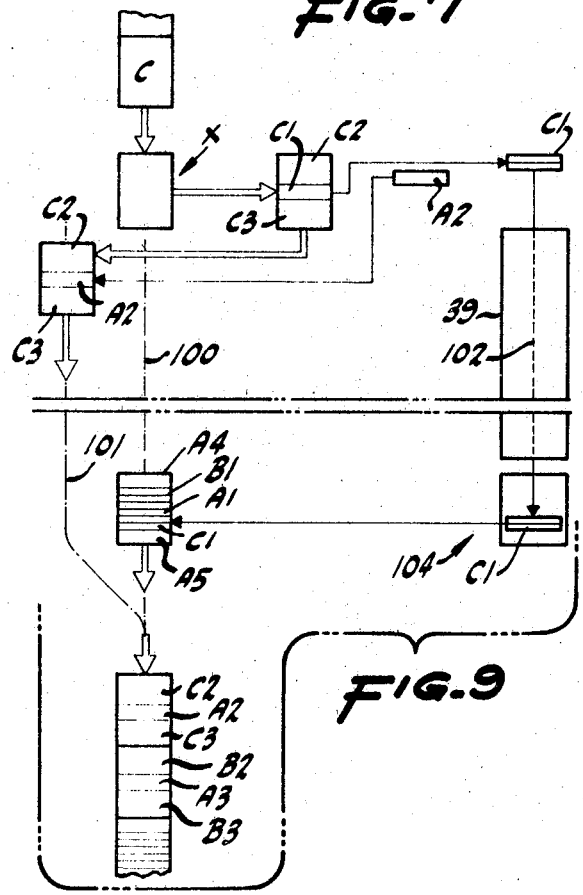
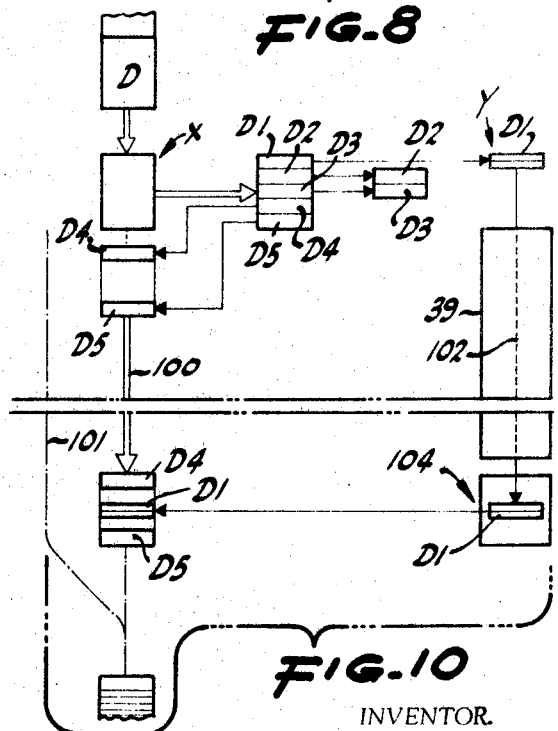
INVENTOR.
GARY C. MYLIN
BY
Boyken, Mohler, Foster & Schlemmer
ATTORNEYS

# United States Patent Office 3,515,053
Patented June 2, 1970

3,515,053
MEAT INSPECTION SYSTEM AND METHOD
Gary C. Mylin, San Francisco, Calif., assignor to Import Inspection Services, San Francisco, Calif., a corporation of California
Filed June 14, 1968, Ser. No. 737,118
Int. Cl. A23b *1/06*
U.S. Cl. 99—194                     11 Claims

ABSTRACT OF THE DISCLOSURE

A portable apparatus for use by innspectors in inspecting imported frozen meat in accordance with required standards, comprising a vehicle adapted to be positioned relatively close to the unloading point, which vehicle encloses a relatively sterile area including conveyors, a saw, a thaw tank, and an inspection stand in an arrangement to expedite the inspection of a uniform size portion of each block of frozen meat. The arrangement also provides a method of handling the meat.

BACKGROUND OF INVENTION

Imported frozen meat normally arrives at a port of importation in blocks of substantially uniform weight enclosed in relatively thin plastic wrappers or envelopes. A plurality of such frozen blocks are in each of the cartons or containers. A normal shipment may be five hundred and sixty of such cartons, and fifteen samples, or cartons, are drawn from the shipment for inspection.

Heretofore, one crew at the pier where the shipment is to be unloaded would, after arrival of the vessel, withdraw the required samples and affix the Federal stamps. Also required was a truck and a driver to transport the samples, so withdrawn, to an inspection site remote from the pier. Another crew was required at the inspection site to prepare the blocks and to assist in the inspection. The inspected blocks would then be returned to the pier where they would be added to the remainder of the shipment for delivery to the consignee.

By the present invention, only one crew, stationed at the pier with the inspection vehicle, would withdraw the required number of samples from the shipment, deliver them to the inspection vehicle, positioned relatively close to the vessel, prepare the samples for inspection, assist the inspectors with the inspection, return the samples to the original lot, and affix the Federal inspection stamps. Usually by the time the shipment is unloaded from the ship the samples have been withdrawn, inspected, released, and returned to the shipment with the stamps affixed, to be picked up for delivery to the consignee.

Obviously, the saving in time and labor by the employment of the inspection vehicle of this invention is great, as is the method enabled by the use of the mobile inspection vehicle.

It is highly desirable that the time the frozen meat is subjected to atmospheric temperature be reduced to a minimum, and the points where the meat is exposed to atmospheric temperature are at the unloading, loading, and inspection points. It is also important that the costs occurring in the handling and inspection procedures from the unloading of the frozen meat at the dock until it is finally stored under refrigeration, be reduced to a minimum, since the amount of these costs is reflected in the ultimate price of the meat to the user.

The present invention, both as to apparatus and method, materially reduces the time the meat is exposed to atmospheric, or above-freezing temperature, and reduces the handling costs by approximately one-half, and also substantially increases the efficiency of the inspection procedure.

With respect to the inspection procedure in the United States, which is in accordance with requirements prescribed by the United States Department of Agriculture, a sample piece of substantially uniform weight is cut from each block and is removed, thawed, inspected, and restored to a block where it will become refrozen and transported to the warehouse. The result is that a relatively uniform percentage of the meat in a shipment is inspected, which percentage comprises a predetermined amount from each frozen block of the meat, each block being of substantially uniform size and weight.

SUMMARY OF THE INVENTION

This invention provides a method of handling and inspecting a shipment of packages of frozen meat in the form of a plurality of blocks thereof enclosed in each of separate cartons, or containers, between arrival at an unloading point, such as a pier, in a refrigerated, substantially enclosed first area, such as on a ship, and delivery to a refrigerated second substantially enclosed area, such as at the consignee's storage facilities.

A mobile vehicle having therein all facilities for inspection of the required number of samples from a shipment by the government inspectors is provided at the pier or unloading point, which facilities include an enclosed unrefrigerated area that is adapted to be kept free from contamination by foreign material, insects, microorganisms, etc., and which is called a sterile area. Conveyors, a cutter, tables thawing water and other apparatus are provided in said sterile area and are arranged to enable the most efficient handling and inspection of pieces taken from the samples, and to reduce to a minimum the amount of time the samples are separated from the main shipment from which the samples have been taken.

DESCRIPTION OF DRAWINGS

FIG. 1 is a simplified elevational view illustrating a system that incorporates the apparatus of this invention.

FIG. 2 is a top plan view of the interior of the vehicle containing the apparatus of the present invention with the elements of the apparatus in substantially their relation to each other for carrying out the method.

FIG. 6 is an enlarged cross-sectional view along line 6—6 of FIG. 2.

FIGS. 7, 8, 9, and 10 are schematic top plan views showing successive steps in the removal of samples from blocks of meat, their handling, and inspection, and restoration to blocks of the meat from which samples have been removed, and the paths of travel of the blocks and samples afforded by the present invention for expediting the inspection and handling of the meat.

DESCRIPTION OF INVENTION

Figure 3:
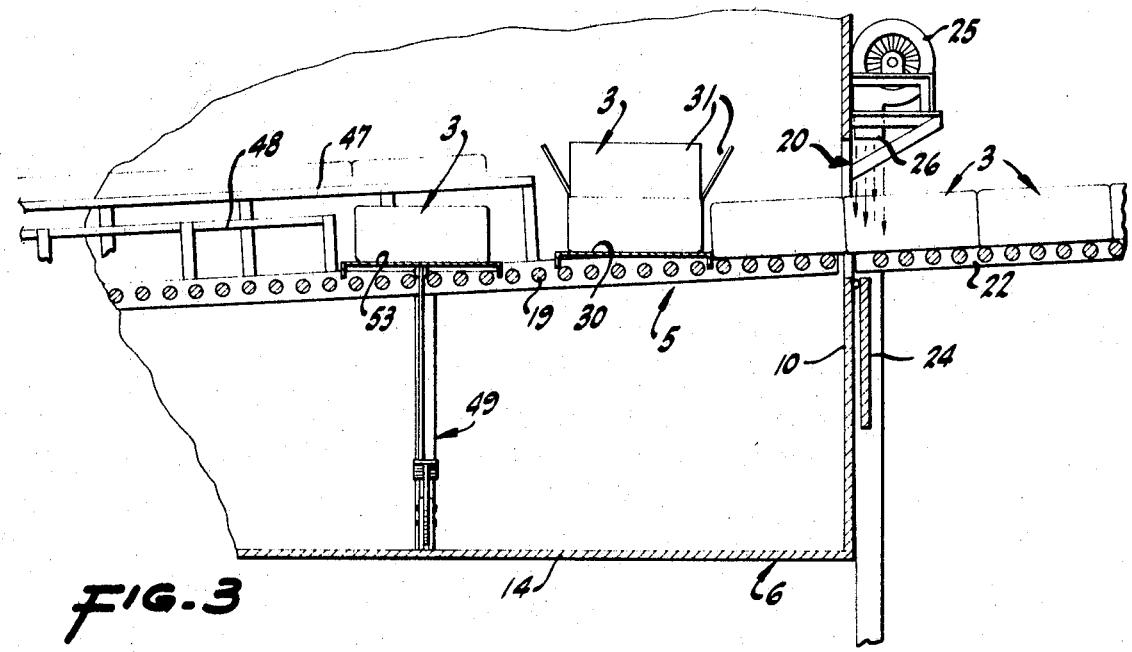
FIG. 3 is a fragmentary cross-sectional view along line 3—3 of FIG. 2.

FIG. 1 shows a ship 1 alongside a dock 2 with packages generally designated 3, each comprising a frozen block of meat within a plastic moisture-resistant wrapper enclosed in a carton being unloaded onto pallets 4. From pallets 4 the packages of meat are successively unloaded onto one end of a conveyor 5 that conducts each package onto the portable vehicle 6 wherein the necessary steps of inspection occur, after which the filled containers, each containing an inspected sample, are conducted by a conveyor out of the opposite end of the vehicle by loading onto pallets 7 that, in turn, are loaded into a refrigerated truck 8 for transport to a cold storage warehouse 9 or to any other desired point.

The position of the vehicle 6 on the dock or pier is in the most convenient available position so as not to interfere with the unloading and movement of other cargo that may be on the ship, and the packages may be positioned on pallets within the hold of the ship and transferred to the dock by the usual hoists on the ship or dockside hoists, for subsequent movement to the vehicle by conventional lift trucks, which are common dock procedures. The important feature is that the vehicle 6 is at the dock in a position for delivery of the packages a short distance from the ship to the vehicle, for inspection in the latter, and then for transfer directly to a cold storage area that normally is a relatively long distance from the dock.

By the present procedure, the labor costs chargeable to the importer are substantially reduced by elimination of the double handling of the packages when the inspection is at the latter.

The vehicle 6 is elongated, having its inlet end, through which the packages of frozen meat enter the vehicle, at the upper end as seen in FIG. 2, and at the right-hand end as seen in FIG. 1. The outlet end is at the bottom, as viewed in FIG. 2 and at the left end of the vehicle as seen in FIG. 1.

End walls 10, 11 (FIG. 2) are respectively at the inlet and outlet ends, and side walls 12, 13 provide opposite sides. A floor 14 and top wall 15 (FIG. 1) enclose the area within the vehicle, and the inner surfaces of the walls, floor and top, and the equipment within the vehicle are preferably of substantially all of non-rusting metal, irrespective of what the framework may be, so as to facilitate cleaning with water or steam and to insure against bacterial development and contamination.

Transparent windows may be provided in any of the aforesaid walls as desired, for light and also door 18 is in one of the walls for entry and exit of inspectors and helpers, said door being closed except during said entry and exit to exclude dust, etc.

Conveyor 5 is shown as a conventional roller conveyor, and it is preferably in several parts, with a main central section 19 (FIG. 2) extending lengthwise of the vehicle 6 from an inlet 20 (FIGS. 2, 3) in the inlet wall 10 to an outlet 21 in the outlet end wall 11.

An extension 22 of conveyor 5 projects outwardly of the latter at the inlet 20 (FIG. 3) and is detachably secured to the section 19, and a similar extension 23 (FIGS. 1, 2) projects outwardly of the outlet and is detachably secured to the end of section 19 opposite to extension 22.

The central section 19 of conveyor 5 (FIG. 2) and extension 22 are substantially in longitudinal alignment and slant downwardly in a direction from the inlet end of the vehicle toward the outlet end to move down the conveyor under the influence of gravity, while the inclination of extension 23 may vary according to the height of the load on a pallet 7 (FIG. 1), although nornormally its inclination is downwardly from the outlet 21 so that packages of meat thereon will move downwardly and outwardly of the outlet. When the vehicle is not in use, the extensions 22, 23 are disconnected from the ends of the central section 19 and are positioned within the vehicle on the end portions of the central section for storage, and closures 24 (FIGS. 1, 3) adapted to relatively tightly seal the inlet and outlet are moved to positions closing the inlet and outlet.

Over inlet 20 is a blower 25 (FIG. 3) having a downwardly discharge nozzle 26 extending the width of the inlet for forming a generally vertical curtain of moving air across said inlet, which blower may include a filter screen across the inlet thereto or the outlet, so that dust, flies, etc. will not enter the inlet 20 with the packages of frozen meat or at any time during operation of the blower, while the packages may freely pass through said inlet 20.

A corresponding blower 27 (FIG. 1) that includes a nozzle corresponding to nozzle 26 extends across the discharge or outlet opening 21.

The packages 3 on a pallet 4 (FIG. 1), or other suitable support, are successively positioned by an operator, on extension 22 of conveyor 5 and are carried through inlet 20 to a position within the vehicle 6 (FIGS. 2, 3) and on the upper end of the central section 19 of the roller conveyor, where the leading package is stopped by a substantially horizontally disposed stationary platform 30 (FIGS. 2, 3) extending over and adjacent to, but spaced above, the rollers of conveyor 5. The dimensions of this platform are such as to support one of the generally horizontally disposed packages of meat thereon, and an operator at platform 30, or adjacent thereto, will lift the package 3 that abuts the edge of the platform 30 at the inlet side thereof, and will slide it onto the platform (FIG. 3).

After package 3 is on platform 30, the conventional closure flaps 31 on the upper side of the carton enclosing the block of meat, are opened, and the plastic wrapper around said block is unfolded. The block is then lifted out and positioned on the table 32 where the operator will cut a desired sample slice therefrom by the blade of a conventional power-driven band saw 33. The band saw 33 is adjacent to the head or inlet end portion of conveyor 5, so that the operator may readily transfer the block of meat to the table 32 and cut the specimen therefrom while he remains in substantially in the same location.

Hereinafter the words "head end" and "foot end" are synonymous with "inlet end" and "outlet end," the head end of any of the elements within the vehicle being the end nearest to the inlet end wall 10 and the foot end benig the end nearest outlet wall 11.

An example of a cycle followed in cutting the specimens and reloading or refilling the cartons will be described in detail later on, as illustrated in FIGS. 7–10, but at this point, the description will be general and mainly restricted to the apparatus for use in performing the method.

Figure 5:
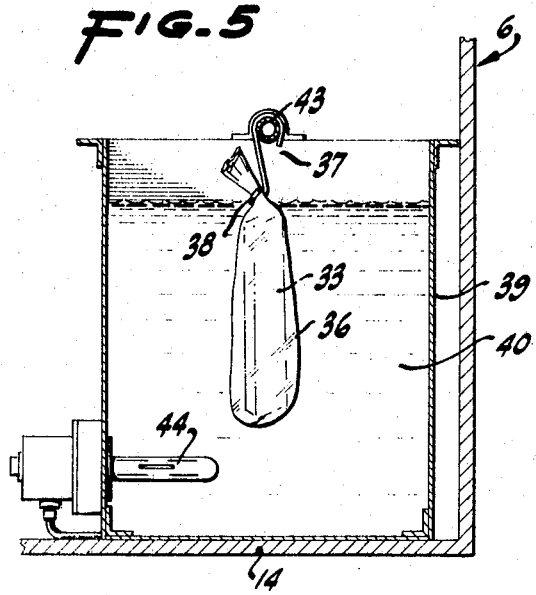
FIG. 5 is an enlarged cross-sectional view along line 5—5 of FIG. 2.

The sample taken at the table 32 for future inspection, is normally cut into two approximately equal pieces 34, to accelerate the thawing period, and these pieces are transferred to a table 35 that, in turn, is relatively close to the band saw, and in a position alongside this table is a supply of waterproof transparent plastic bags 36. The two pieces of the sample 34 are placed in one of said plastic bags 36 (FIG. 2) at table 35, and the bag is tied shut at its upper end and a hook 37 (FIG. 5), or any other suitable means, is removably connected with the tie 38.

The central main section 19 of conveyor 5 is positioned alongside and parallel with the side wall 12 of the vehicle 6, which wall 12 is opposite to the wall 13 in which the entrance and exit door 18 is positioned, the latter being adjacent to the end wall 10.

Along the side wall 13 that is opposite to wall 12 is an elongated tank 39 for water 40, which tank extends longitudinally of the vehicle substantially parallel with conveyor 5, but spaced from the latter to provide an aisle between them (FIG. 2).

At least one bar 43 (FIGS. 2, 5, 6) is supported on tank 39 above the water 40 in a position extending longitudinally of said tank, and the level of water, in the tank is such that each sample of meat enclosed within each bag 36 will be below the level of the water level when each bag is suspended by each hook 37 from the bar. A bag so suspended is adapted to be moved along the bar from one end of the bar to the other while the portion having the meat therein remains fully immersed in the water.

A plurality of thermostatically-controlled heating elements 44 are within the body of water 40 at spaced intervals from one end of the tank to the other.

One end of tank 39 is adjacent to table 35, which end is the "head" end, inasmuch as each sample bagged and labelled at table 35 is suspended into the water at said end and is progressively moved to the opposite or "foot" end. Hereinafter the "head" end will designate the end of any element or portion nearest the inlet end of the vehicle, while the "foot" end is the opposite end.

Preferably the thermostatic controls 45 of the heating elements are set to maintain the water temperature at the head end of the tank higher than at the foot end. For example, at the head end the heater may be set to maintain a temperature of approximately 160° F. while the heater in the foot end may be set to mainttain a temperature of approximately 120° F., with intermediate heaters at temperatures intermediate 160° F. and 120° F. By this arrangement, a relatively uniform progression in the thawing of the meat occurs, inasmuch as the meat is coldest at the head end and is sufficiently thawed at the foot end to enable effective inspection, without danger of cooking the meat. Usually the thawing step may be accomplished in from 30 to 45 minutes for pieces of approximately 6 pounds each, which is normally the approximate weight of each of the two pieces in each bag.

Figure 4:
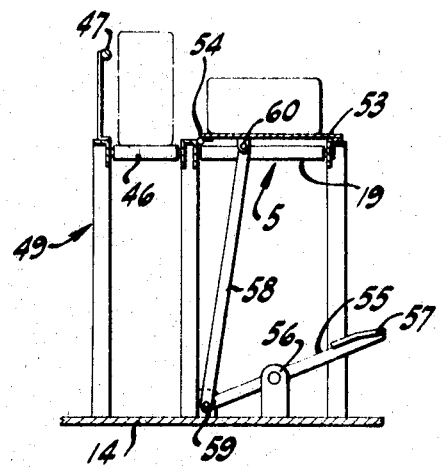
FIG. 4 is a fragmentary cross-sectional view along line 4—4 of FIG. 2.

While conveyor 5 is adjacent to the side wall 12 of the vehicle, a by-pass conventional roller conveyor 46 (FIG. 2) of narrower width than conveyor 5 approximately adjoins and is parallel with the main section 19 of conveyor 5, being positioned between section 19 and wall 12. This conveyor 46 is inclined in the same direction as section 19, the head end of conveyor 46 being positioned approximately at the platform 30 and the foot end being adjacent to outlet 21. A guide bar 47 (FIGS. 2, 4) is supported on the conveyor supporting frame in an elevated position spaced above the level of said conveyor 46 and extends parallel with the latter from the head end of conveyor 46 to a point adjacent its foot end, and at the side of conveyor 46 that is adjacent to wall 12. A second guide bar 48 (FIGS. 2, 3) is parallel with conveyor 46 and at a level below that of bar 47, and is between section 19 of conveyor 5 and conveyor 46.

This second guide bar 48 is also supported on the conveyor supporting frame, generally designated 49, and which frame may support both section 19 of conveyor 5, and conveyor 46 at approximately waist level so as to enable a standing operator to readily manipulate the packages and to remove and replace meat in the packages. The various tables, and tank 39, are at levels most convenient for a standing operator to handle the packages, the blocks of meat, and the samples.

Guide bar 47 terminates at its head end at a point within the vehicle, spaced from inlet 20 a distance at least equal to the horizontal dimension of a package, and slightly greater, while the foot end of guide bar 47 terminates at a point adjacent to the outlet 21.

The end portion 50 of guide bar 47 at the fooot end of the vehicle extends slantingly and laterally across the foot end portion of conveyor 46 (FIG. 2) and the foot end of guide bar 48 terminates at its foot end at approximately the point where portion 50 of guide bar 47 commences to cross conveyor 46.

Alongside the foot end of the guide bar 48 is a plate 51 that substantially corresponds to plate 30 and that functions as a stop for the packages on conveyor 5.

The space between bars 47, 48 is greater than the thickness of packages 3 (FIG. 4) but substantially less than their width, so that a package disposed vertically on its edge may readily be carried down conveyor 46, but upon engaging the inclined portion 50 of guide bar 47 the package will be deflected onto the lower end portion of section 19 beyond plate 51 and toppled to be flat on the latter with the closure flaps uppermost, for passage out of the vehicle in the same position as when the packages entered the vehicle.

Adjacent to platform 30 and at the side of the latter nearest the exit, a horizontally disposed plate 53 (FIGS. 2, 3, 4) is disposed over the section 19 of conveyor 5, which plate is slightly spaced above the rollers of the section 19 and a slightly lower level than plate 30. Platform 53 is hingedly connected to the conveyor frame 49 along its endge that is adjacent to conveyor 48 by a hinge 54 (FIG. 4), and the opposite edge is adapted to be supported on said frame. A treadle bar 55 below section 19 of conveyor 5 is pivoted at 56 intermediate its ends and a foot engageable treadle 57 on one end of bar 55 is accessible to the foot of an operator adjacent section 19 at the aisle side of the latter. A generally vertically extending link 58 is pivotally connected at 59 at its lower end with the end of bar 55 opposite to the treadle 57, while the upper end of link 58 is pivotally connected at 60 with a bracket secured to the underside of plate 53 and spaced from hinge 54. When a package 3 is flat on plate 53 and the foot treadle 57 is pressed downward, the package will be tilted and transferred to the head end of conveyor 46 in an upright position on said conveyor 46 for passage of the package, on edge, on conveyor 46 to the foot end of the latter where it will be again tilted back to horizontal position on the foot end of section 19 by deflector 50. Guide bar 47 will not only cooperate with guide bar 48 to hold the packages on conveyor 46, but will hold the closure flaps on the packages in substantially closed position.

A table 63 is positioned adjacent to the band saw and table 35 at the head end of the aisle between tank 39 and conveyor 5 for supporting pieces of meat thereon, as will later be described.

Adjacent to the foot end of tank 39 is a table 64 that is preferably at a higher elevation than tank 39, and an upwardly opening pan 65 is adapted to be supported on said table. This pan has side walls and an end wall and is of a size adapted to hold the two-piece sample of meat in each bag 36 and may be elongated in one horizontal direction with the side walls at the end opposite to the aforesaid end wall narrowed and inclined outwardly and upwardly relative to the bottom 65 to provide a pouring lip 66 (FIGS. 2, 6) adapted to enter the open upper end of a bag 36 when the bottom 65 is tilted by upward movement of the end opposite to said lip. A handle 67 is on said end wall of the pan opposite to said lip for manual grasping to tilt the pan (FIG. 6).

Table 64 may have an extension 68 at one side (FIG. 6) that is at approximately the level of the upper side of tank 39, and at the opposite side is a platform 69 that may be at a level below the level of table 64 of approximately the length of the samples 34.

Tank 39 is provided with a valved inlet and outlet pipe 70 (FIG. 1) extending outside the vehicle adapted to be connected with a water supply for filling the tank, and adapted to also function as a drain for draining the tank, and wash stands 71 at the head and foot ends of the vehicle are connected with water supporting tanks for use by the operators and inspectors for washing their hands.

The several tables above described, including table 35, are preferably supported on casters in the same manner as indicated at 72 for table 64 and its exterior 68 and platform 69 (FIG. 6) so as to enable the inspectors and operators to position them most conveniently for their use, but they are retained in the head and foot ends of the vehicle substantially as described.

At this point, it is again emphasized that one of the objects of the invention is the provision of a method for expediting the handling and inspection of the meat so that the latter will be exposed to atmosphere temperature for a minimum amount of time, while a uniform amount of meat from each package will be thawed, inspected, and returned to a package containing frozen meat for refreezing by heat transfer between the latter and the thawed meat within the package and finally at the point of storage.

The area within the body of the vehicle 6 will be called the "sterile area" inasmuch as it is substantially isolated from the area around it and the inner surfaces of the walls, floor and ceiling of said body, and the elements within said vehicle, are non-moisture absorbent affording no breeding places for bacteria, and which surfaces are readily cleaned by steam or septic solutions. The air curtains at the inlet and exit preclude entry of insects, dust, etc.

Within the sterile area, three paths of travel extend longitudinally of the vehicle. The main path is designated 100 (FIGS. 7–10) which is provided by conveyor 5 (FIG. 2) and which extends through the inlet and outlet.

The second path is 101 (FIGS. 7–10) and is alongside and parallel with path 100 and is provided by conveyor 46 (FIG. 2) and the third path is 102 (FIGS. 7–10) and is provided by bar 43 of tank 39 (FIG. 2).

The container portions of the packages travel along paths 100 and 101, while sections of the meat to be inspected move along path 102 and a sectioning and selective handling of meat occurs at a cutting and transfer station 103 at the head ends of paths 100 and 102. The inspection and transfer of a sample removed at transfer station 103, occurs at the inspection station 104 at the foot ends of paths 100 and 102.

As an example (FIG. 7) the packages 3 are of uniform oblong shape and size, each containing sixty pounds of frozen meat in a homogeneous block. At the head end of path 100 on conveyor 5 are the first two packages A and B, with A in the leading position. This package A is moved in path 100 to position X (FIG. 7) on table 30 (FIG. 2) where the folding flaps and waterproof plastic wrapper around the block are opened and the block of frozen meat is moved along a lateral path to the cutting station where the band saw 33 divides it transversely of the length of the block into five sections (FIG. 7) A1, A2, A3, A4, and A5, each of which weighs approximately twelve pounds. Any one of these may be the sample for thawing and inspection. Assuming the sample is A1, the latter is cut into two pieces to expedite thawing, and is moved to position Y which is on table 35 (FIG. 2) where said pieces are inserted into a bag 36, and the bag with said pieces comprising section A1 is suspended from bar 43 for movement along said bar to the foot end of the tank, to thaw said pieces for inspection.

The sections A4 and A5 are replaced in the wrapper from which they had been removed, and then replaced in the carton at opposite ends of the latter (FIG. 7) which carton may have been placed on plate 53, or may have remained on platform 30. In any event, after said sections A4 and A5 have been so placed back in the wrapper and in the carton, the latter is moved onto the conveyor section 19 of conveyor 5, below plate 53 and is carried on said conveyor to abut plate 51. This latter plate is disposed over the conveyor 5 and corresponds to platform 30.

When the section A1 reaches the foot end of the tank 39 and is adequately thawed for inspection, it is removed and is placed on table 68 (FIG. 2) and the two pieces comprising said section are then placed on pan 65 and inspected. Juice, rich in protein, will drain from the pieces and collected in pan 65, and after the inspection, the open mouth of a bag 36, supported on platform 69 (FIG. 6), will be positioned over the pouring lip 66 of pan 65, and the latter will be tilted so that the pieces comprising section A1 will slide into the bag, together with the valuable juices. The bag is then closed and the section A1 is positioned between pieces A4, A5, in a partially empty carton (FIG. 7) that has been moved to the platform 51.

After package A has been removed from its leading position shown in FIG. 7, the next package B on conveyor 5 will have advanced to station X (FIG. 8) and the block of meat in package B will then be removed from its wrapper and the carton, and be moved to the table 32 for cutting by band saw 33 into sections B1, B2, and B3 (FIG. 8). The section B1 is a twelve-pound section and may be cut from the central portion of the block, while B2 and B3 may each be a twenty-four pound section at opposite sides of section B1.

The section B1 is the sample to be inspected and is divided by the band saw 33 and then bagged at the station Y and thereafter suspended from bar 43 within the water in the head end of tank for movement through the heated water in tank 39 along path 102 following the piece A1.

The sections B2 and B3 are replaced in the wrapper in the carton on plate 53 at opposite ends of the carton, and filler section A3 (FIG. 8) which is on table 63 (FIG. 2) is placed in the space from which section B1 was removed, thus filling the carton, after which it is tilted onto the head end of conveyor 46 for movement along path 101 to the foot end of said conveyor where it is toppled onto the foot end of conveyor 5 by guide bar 50 for travel along path 100 through the outlet 21 of the vehicle for loading into the refrigerated truck for carrying to the storage warehouse. Thus, the sections B2, B3 and A3 are exposed to atmospheric temperature for a relatively short period of time, none having been thawed.

Upon its arrival at the foot of the tank 39, and inspection, the pieces comprising section B1 follow the same procedure as described for A1, and said section B1 is placed in the carton that holds sections A1, A4 and A5 (FIG. 8), thus leaving a space open between the frozen sections A4 and A5 for one more twelve-pound section.

The positioning of package B on platform 30 (FIG. 2) at station X will result in the next package, indicated at C in FIG. 9 being brought to station X where it, in turn, will be positioned on the table 30 at station X, and the carton and wrapper will be opened and the block of frozen meat transferred to the table of the band saw 33 where a twelve-pound section C1 is removed, leaving two twenty-four pound sections C2 and C3 that are replaced in the wrapper and carton from which removed, and the twelve-pound frozen filler section A2 (FIG. 9), which is on table 63 (FIG. 2) is placed between them in said carton. This carton, as in the case of package B, is tilted onto conveyor 46 for a through passage to the foot end of conveyor 5 and onto the latter and through outlet 21 for loading into truck 8.

The package D that follows removal of package C is next positioned at station X and the block of frozen meat is removed and cut into five sections D1, D2, D3, D4, and D5, to commence another cycle corresponding to the one starting with the package A in which two filler sections D2, D3 are provided, while section D1 is divided into two pieces for thawing and inspection, and the remaining two sections D4 and D5 are replaced in the carton at its opposite ends for movement on conveyor 5 along path 100 to the stop at the foot end of vehicle to await filling by the pieces of the inspected sections.

In actual practice, several partially filled cartons may be held on conveyor 5 adjacent to the inspection station for filling, but the cartons of filled frozen sections immediately pass to truck 8 or to a pallet 7, for transfer to the refrigerated warehouse and as each of the cartons leaving the inspected sections are filled, they also are moved rapidly along path 100 out of the vehicle 6 to the truck.

Except for such transverse movement as occurs in the head and foot ends of the vehicle 6 the movement of the frozen and inspected meat is through the vehicle longitudinally thereof from one end to the other, the vehicle comprising a sterile portion of the path of travel from one refrigerated area to another refrigerated area, the sterile enclosed space within the vehicle 6 being at substantially atmospheric temperature. The first refrigerated area, such as within a ship, may vary, but the vehicle 6, being a portable or movable vehicle, is readily moved from a point adjacent one area to a point adjacent a changed area, or from one dock to another, so that the meat is inspected when it is unloaded at the dock or unloading point.

Inasmuch as the frozen blocks are at a temperature of approximately −20° F. to approximately −30° F. when unloaded from a ship, except for the one section from each block that is inspected, none of the sections will be thawed during movement from the unloading station to the refrigerated area to which they are moved following passage through the storage area, and the temperatures of the sections at the ends of a container or carton, and between which thawed sections are positioned is sufficiently low to freeze the thawed sections without becoming thawed themselves, where the present invention is employed.

The movement of the cartons, blocks of meat therein and the specimens cut for inspection all move along a path that is substantially coincidental with the path over conveyor 5, which path extends into and out of the sterile area enclosed by the body of the vehicle 6, and the paths of movement of the packages on conveyor 46 and of the sample sections through the water tank 39, said latter paths being along the path of movement of the cartons on conveyor 5 in that they are parallel with and alongside the latter and are all within the vehicle 6.

It is to be understood that changes may be made in the construction and in the combination and arrangement of elements, and in the method as described in detail in the foregoing description, provided they come within the scope of the appended claims and within the spirit of the invention.

I claim:

1. The method of handling and inspecting samples of frozen meat from a shipment of packages thereof, between the arrival of said shipment within a refrigerated first area, at an unloading point, and delivery thereof to a refrigerated second area at a remote point from said unloading point, said packages each being a frozen block of meat enclosed within a container, comprising the steps of:
   (a) moving a plurality of said containers generally in one direction from said first area to said second area and through an enclosed wheel mounted unrefrigerated sterile area adjacent to said first area, which enclosed sterile area has an inlet and an outlet for movement of said containers into and out of said sterile area,
   (b) removing each block within said sterile area from each container and cutting it into a plurality of pairs of frozen sections and thereafter replacing at least one pair of said sections in each container leaving a space between said pair, and retaining one frozen section from each of said plurality of pairs for thawing and inspection within said sterile area,
   (c) filling the space so left in certain of said containers by a frozen section cut from the removed block of another container to leave a space in such other container and immediately thereafter continuing the movement of said certain containers, when so filled, in said one direction out of said sterile area for further movement to said second area, and retaining such other containers within said sterile area for filling the spaces left therein with sections that have been thawed and inspected,
   (d) thawing and inspecting said one section retained from each block and thereafter filling the space in each of said other containers by sections so thawed and inspected, and thereafter moving each of said other containers out of said sterile area for movement to said second area.

2. The method as defined in claim 1, that includes the steps of:
   (e) cutting each of said one frozen sections into a pair of pieces before thawing and inspecting, and thereafter,
   (f) enclosing said last-mentioned pair of pieces in a waterproof bag and suspending each such bag containing a pair of said frozen pieces within a body of water at a thawing temperature until the section comprising said pair of pieces is thawed.

3. The method as defined in claim 1, that includes the steps of:
   (e) collecting the meat juice drained from said one section during thawing and inspection and, after said inspection, depositing said one section and the said juice drained therefrom in a waterproof envelope for positioning of said bag containing said thawed section, including said juice, in the space between frozen sections in one of said other containers for filling said other container and for refreezing of each thawed section so positioned between said last-mentioned frozen sections by heat transfer from said last-mentioned sections.

4. The method as defined in claim 1 that includes the step of:
   (e) establishing a moving air curtain across said inlet and said outlet to exclude dust, insects and other impurities in the air from entering said inlet and said outlet during movement of said containers into and out of said sterile area.

5. The method as defined in claim 1 that includes the steps of:
   (e) shunting said certain of said containers, when filled, past said other of said containers while said other of said containers are within said sterile area awaiting the thawing of said one of said frozen sections from each of the plurality of frozen sections of each block, whereby said certain of said containers will be delayed in movement through said sterile area for substantially only the step of removal of a block therefrom and the cutting of such block into sections.

6. The method as defined in claim 1:
   (e) the movement of said certain of said containers and said other of said containers being in a pair of substantially parallel paths within said sterile area intermediate said inlet and said outlet, having one of their ends adjacent to the latter.
   (f) moving said one frozen section from each of said blocks during thawing thereof, in a path substantially parallel with and spaced from said pair of paths in side-by-side relation thereto having one end thereof adjacent to said outlet, thereby providing a space between said pair of paths and said path of travel of each of said one sections, for inspection of each of said one sections at the ends of said pair of paths that are adjacent to said outlet.

7. An inspection vehicle adapted to be positioned adjacent each of different unloading points for use by inspectors of shipments of meat in the form of frozen blocks of meat each enclosed in a container, comprising:
   (a) a wheel mounted, portable body having a top, bottom, and lateral side walls enclosing a substantially sterile area for inspection of meat therein and said body having an inlet and an outlet,
   (b) conveyor means extending through said body from said inlet to said outlet for carrying said containers for movement through said sterile area from said inlet to said outlet,
   (c) cutting means within said sterile area adjacent to said inlet and one end of said conveyor means for cutting the block in each container into sections upon removal of each block from its container,
   (d) a thawing tank for thawing water within said sterile area alongside but spaced from said conveyor means to provide a space between the latter and said tank for an inspector,
   (e) heating means within said tank for heating water therein to thawing temperature and for maintaining it at said temperature,
   (f) a support between said tank and said conveyor means positioned adjacent said outlet for supporting thawed meat from said tank, and
   (g) stop means at the end portion of said conveyor means adjacent to said outlet for holding containers stationary at said stop means for insertion of thawed sections of meat after removal thereof from said tank and inspection thereof.

8. In a vehicle as defined in claim 7:
(h) said conveyor means including a pair of conveyors in side-by-side relation, one conveyor of said pair extending from a point adjacent to but spaced from said inlet and connected with the other conveyor of said pair adjacent to but spaced from said outlet, and said other conveyor extending through said body and through said inlet and said outlet, whereby a container on said other conveyor entering said inlet may have a section removed from the block therein adjacent said cutting means and replaced by a frozen section cut from another block and then shifted to said one conveyor for movement past containers on said other conveyors and out of said outlet,
(i) said stop means being between said inlet and the connection between said one conveyor and said inlet to enable said movement of said one container on said one conveyor past the containers held by said stop means.

9. In a vehicle as defined in claim 8:
(j) means adjacent to said cutting means for transferring said one container from said other conveyor onto said one conveyor.

10. A portable vehicle adapted to be positioned adjacent inspection points for use by inspectors of shipments of meat in the form of frozen blocks of meat each enclosed in a container, comprising:
(a) a wheel mounted enclosed body for an inspector and assistant personnel, having an inlet for entry of containers and an outlet for their exit,
(b) a main conveyor extending into said body through said inlet and through said body and out of said outlet for carrying said containers,
(c) a cutting station adjacent to but spaced from said inlet, including a saw for cutting a section from the block within each container entering said inlet, and a stationary first platform adjacent said conveyor adjacent to said inlet for supporting each container stationary during removal of the block therefrom for cutting said section, and removal of said section for inspection,
(d) stop means against said conveyor at a point adjacent to said outlet for holding a container stationary during replacement of an inspected section in a container from which a section has been removed,
(e) an inspection station adjacent to said outlet, but spaced therefrom and adjacent to said conveyor, including a table for holding a thawed section for inspection thereof,
(f) thawing means between said cutting station and said inspection station for supporting a section cut from a frozen block at said cutting station for movement from said cutting station to said inspection station at a thawing temperature.

11. In a vehicle as defined in claim 10:
(g) said stationary platform being over said conveyor,
(h) said stop means comprising a second stationary platform over said conveyor for supporting a container thereon for said replacement by an inspected section,
(i) an auxiliary conveyor alongside said main conveyor at a point between said outlet and said second stationary platform for supporting containers therein for movement onto said main conveyor at said last-mentioned point,
(j) means adjacent to said first platform for moving a container adjacent to said cutting station onto said auxiliary conveyor for movement past said stop means and onto said main conveyor at said point.

References Cited

UNITED STATES PATENTS

| | | | |
|---|---|---|---|
| 1,991,316 | 2/1935 | Gage | 73—432 X |
| 2,473,033 | 6/1949 | Letac | 73—432 X |
| 2,492,387 | 12/1949 | Lundell | 17—1 |
| 2,827,844 | 3/1958 | Weir | 98—36 |
| 2,833,000 | 5/1958 | Jurgensen | 296—1 X |
| 2,923,028 | 2/1960 | Lundell | 17—1 |
| 3,178,929 | 4/1965 | Goss | 73—432 X |
| 3,221,632 | 12/1965 | Copp | 98—36 X |
| 3,380,369 | 4/1968 | Allander | 98—36 |
| 3,396,280 | 8/1968 | Knudsen | 73—432 |
| 3,422,600 | 1/1969 | Chamberlain | 98—36 |

WALTER A. SCHEEL, Primary Examiner

L. G. MACHLIN, Assistant Examiner

U.S. Cl. X.R.

17—1; 73—421; 99—107, 234